United States Patent
Guha et al.

(10) Patent No.: US 7,519,613 B2
(45) Date of Patent: Apr. 14, 2009

(54) METHOD AND SYSTEM FOR GENERATING THREADS OF DOCUMENTS

(75) Inventors: Ramanathan Vaidhyanath Guha, Los Altos, CA (US); Shanmugasundaram Ravikumar, San Jose, CA (US); Dandapani Sivakumar, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/364,038

(22) Filed: Feb. 28, 2006

(65) Prior Publication Data

US 2007/0203924 A1  Aug. 30, 2007

(51) Int. Cl.
G06F 7/00 (2006.01)
G06F 17/00 (2006.01)
G06F 17/30 (2006.01)

(52) U.S. Cl. .......................................... 707/102; 707/7
(58) Field of Classification Search ................. 707/3, 707/7, 102
See application file for complete search history.

(56) References Cited

U.S. PATENT DOCUMENTS

| | | | |
|---|---|---|---|
| 5,808,615 A * | 9/1998 | Hill et al. | 715/853 |
| 6,240,409 B1 | 5/2001 | Aiken | |
| 6,493,709 B1 | 12/2002 | Aiken | |
| 6,658,626 B1 | 12/2003 | Aiken | |
| 6,865,715 B2 * | 3/2005 | Uchino et al. | 715/277 |
| 7,149,736 B2 * | 12/2006 | Chkodrov et al. | 707/7 |
| 2003/0217047 A1 * | 11/2003 | Marchisio | 707/3 |
| 2004/0139042 A1 | 7/2004 | Schirmer et al. | |
| 2006/0161560 A1 * | 7/2006 | Khandelwal et al. | 707/100 |

OTHER PUBLICATIONS

Ravi Sundaram et al, "Unweaving a Web of Documents," Aug. 21-24, 2005, pp. 574-579.*
Ravi Sundaram et al, "Unweaving a Web of Documents," Jan. 2006, pp. 1-10 Available Online: http://web.archive.org/web/20060114064200/http://www.ccs.neu.edu/home/koods/papers/guha05unweaving.pdf.*
Christos, "11.1 Dynamic Programming", Feb. 2005 Available online: http://www.cs.berkeley.edu/~pbg/cs270/notes/lec11.pdf.*
Guillaume et al, "Clustering of XML documents", 2000, Esevier Science B.V.*
Guha, et al.; Unweaving a Web of Documents; WWW2005, May 10-14, 2005, Chiba, Japan; 8 pages.

* cited by examiner

Primary Examiner—Mohammad Ali
Assistant Examiner—Brannon W Smith
(74) Attorney, Agent, or Firm—Schmeiser, Olsen & Watts;

(57) ABSTRACT

A method and system for generating threads of documents from a collection C of documents containing terms. Each document of C has a timestamp and an associated timestamp index. The timestamp indexes are ordered in accordance with an ordering of the associated timestamps. A relevance graph G generated from C is an acyclic directed graph. Each node of G denotes a document of C. Each edge of G connects a pair of directed nodes pointing from a node having an earlier timestamp to a node having a later timestamp. At least one thread of G is determined by executing a matching-based algorithm or a dynamic programming algorithm. Each thread is a path through G originating at a first node and terminating at a second node and including one or more contiguous edges from the first node to the second node. The at least one thread is outputted.

4 Claims, 8 Drawing Sheets

METHOD AND SYSTEM FOR GENERATING THREADS OF DOCUMENTS

BACKGROUND OF THE INVENTION

1. Technical Field

The present invention relates to a method and system for generating relevant threads of documents from a collection of time-stamped documents.

2. Related Art

Organizing and searching document collections for the purpose of perusal by human users may relate to the following categories: automatic construction of hypertext and hyperlinks; burst analysis and prediction of news events; and clustering and automatic identification of communities.

There has been lot of work on automatically generating hypertext, beginning with the thesis of Allan [4]. Works closely to the present invention are Dalamagas and Dunlop [10] and Dalamagas [9]. The preceding works consider the problem of automatic creation of hyperlinks for news hypertext which is tailored to the domain of newspaper archives. The method in the preceding works is based on traditional clustering tools. Dalamagas [9] also explores the use of elementary graph-theoretic tools such as connected components to identify threads in news articles and builds a prototype system. Smeaton and Morrissey [21] use standard information retrieval techniques to compute a graph that is based both on node-node similarity and overall layout of the hypertext; they then use this graph to automatically create hyperlinks. Blustein [8] explored the problem of automatically creating hyperlinks between journal articles. Green [13] develops a notion of semantic relatedness to generate hypertext. However, most of these work focus on examining the text of a news article and adding hyperlinks to other news articles based on terms, dates, events, people, etc; they do not address the problem of identifying threads in news collection.

Automatically identifying threads in document collections is also related to burst analysis and event analysis. Kleinberg [17] models the generation of bursts by a two-state automaton and proceeds to automatically detecting bursts in sequence of events; Kleinberg looks for the burst of a single keyword. News event prediction and analysis are important topics that have been explored in several contexts. Clustering and text retrieval techniques were used by Yang et al. [25; 5] to automatically detect novel events from a temporally-ordered sequence of news stories. Statistical methods were used by Swan and Allan [23] to automatically generate an interactive timeline displaying major events in a corpus. Uramoto and Takeda [24] describe methods for relating multiple newspaper articles based on a graph constructed from the similarity matrix.

News articles and news groups have been analyzed in the context of search and data mining. Agrawal et al. [2] study the use of link-based methods and graph-theoretic approach to partition authors into opposite camps within a given topic in the context of newsgroups. Finding news articles on the web that are relevant to news currently being broadcast was explored by Henzinger et al. [14]. Allan et al. [6] propose several methods for constructing one-sentence temporal summaries of news stories. Smith [22] examines collocations of dates/place names to detect events in a digital library of historical documents.

Community identification has been studied extensively in the context of web pages, web sites, and search results. Trawling refers to the process of automatically enumerating communities from a crawl of the web, where a community is defined to be a dense bipartite subgraph; an algorithm to do trawling via pruning and the a priori algorithm [3] was presented in [19]. A network flow approach to identifying web communities was given by Flake et al. [11]. Local search methods were used to identify communities satisfying certain special properties in the work of [18]; their interest was to extract storylines from search results.

SUMMARY OF THE INVENTION

The present invention provides a method for generating threads of documents from a collection C of documents, said collection C collectively comprising a set S of terms, each document of C comprising at least one term of S, each document of C having a timestamp and an associated timestamp index, said timestamp indexes being ordered in accordance with an ordering of the associated timestamps, said method comprising:

generating a relevance graph G from C, G being an acyclic directed graph consisting of nodes and edges, each node of G denoting a unique document of C, each edge of G connecting a pair of directed nodes pointing from a node of the pair having an earlier timestamp to a node of the pair having a later timestamp, the documents denoted by the nodes of the pair comprising at least one common term of text;

determining at least one thread of G by executing an algorithm selected from the group consisting of a matching-based algorithm and a dynamic programming algorithm, each thread of the at least one thread being a path through G that originates at a first node of G and terminates at a second node of G, said path comprising one or more contiguous edges of G from the first node to the second node; and outputting the at least one thread.

The present invention provides a computer program product, comprising a computer usable medium having a computer readable program code embodied therein, said computer readable program code containing instructions that when executed by a processor of a computer system implement a method for generating threads of documents from a collection C of documents, said collection C collectively comprising a set S of terms, each document of C comprising at least one term of S, each document of C having a timestamp and an associated timestamp index, said timestamp indexes being ordered in accordance with an ordering of the associated timestamps, said method comprising:

generating a relevance graph G from C, G being an acyclic directed graph consisting of nodes and edges, each node of G denoting a unique document of C, each edge of G connecting a pair of directed nodes pointing from a node of the pair having an earlier timestamp to a node of the pair having a later timestamp, the documents denoted by the nodes of the pair comprising at least one common term of text;

determining at least one thread of G by executing an algorithm selected from the group consisting of a matching-based algorithm and a dynamic programming algorithm, each thread of the at least one thread being a path through G that originates at a first node of G and terminates at a second node of G, said path comprising one or more contiguous edges of G from the first node to the second node; and outputting the at least one thread.

The present invention provides a computer system comprising a processor and a computer readable memory unit coupled to the processor, said memory unit containing instructions that when executed by the processor implement a method for generating threads of documents from a collection C of documents, said collection C collectively comprising a set S of terms, each document of C comprising at least one term of S, each document of C having a timestamp and an associated timestamp index, said timestamp indexes being ordered in accordance with an ordering of the associated timestamps, said method comprising:

generating a relevance graph G from C, G being an acyclic directed graph consisting of nodes and edges, each node of G denoting a unique document of C, each edge of G connecting a pair of directed nodes pointing from a node of the pair having an earlier timestamp to a node of the pair having a later timestamp, the documents denoted by the nodes of the pair comprising at least one common term of text;

determining at least one thread of G by executing an algorithm selected from the group consisting of a matching-based algorithm and a dynamic programming algorithm, each thread of the at least one thread being a path through G that originates at a first node of G and terminates at a second node of G, said path comprising one or more contiguous edges of G from the first node to the second node; and outputting the at least one thread.

The present invention advantageously provides a method and system for efficiently determining relevant threads of documents from a collection of time-stamped documents.

DETAILED DESCRIPTION OF THE INVENTION

1. Overview

Figure 1:
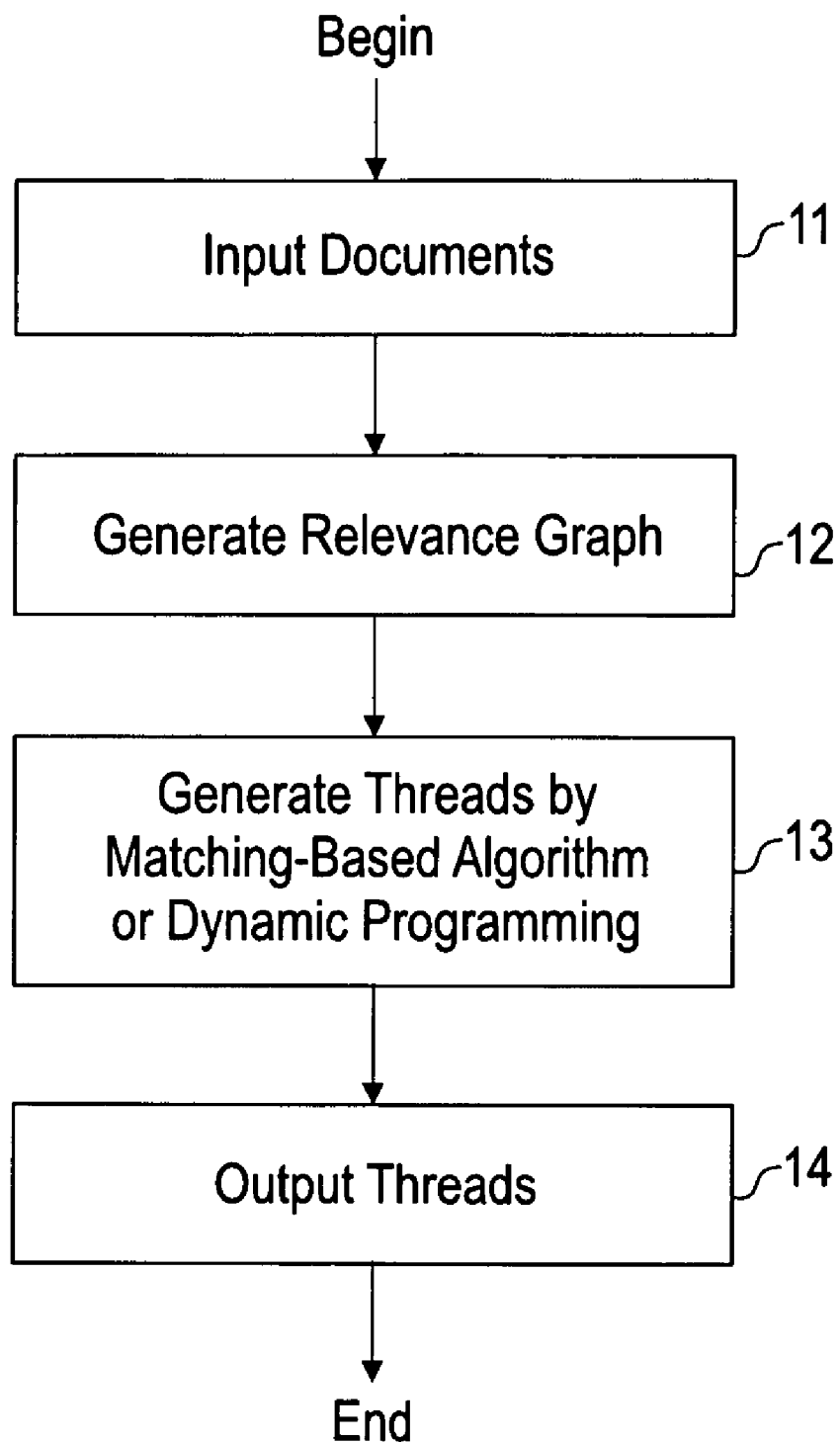
FIG. 1 is a high-level flow chart for generating and outputting threads of documents, in accordance with embodiments of the present invention.

The science of organizing and searching document collections for the purpose of perusal by human users is emerging into a mature discipline. The ubiquity of search as the single most important entry point into users' interaction with large repositories of information has brought to the fore a new class of questions for scientific inquiry. Some of the prominent issues include developing methodologies for searching and organizing specific collections of information; e.g., enterprise data, ecommerce data, medical/legal libraries, news sources, desktop data, etc. Each of these focused problems has its unique set of characteristics in terms of scale, relevant data models, robustness requirements, and tolerance to spam, among other features.

The present invention provides an algorithmic framework for the analysis of large collections of time-stamped text documents to decompose a collection of documents into semantically significant threads. The space of potential applications influences the choice of algorithmic models and ideas employed herein, and helps to distinguish the approach of the present invention from prior relevant work.

At a fairly broad level, collections of documents of text are considered in a single but arbitrary language. Each document has a unique time-stamp. The documents are not required to be drawn from a single source, and all documents in the collection are not required to pertain to a single theme. A few motivating examples follow next.

(1) A first motivating example pertains to an archive of news articles from one or more fairly generic sources (e.g., news feed from AP or Reuters, all articles from The New York Times, a collection of various business articles and analyst reports relevant to a publicly traded stock such as IBM, all articles about European soccer in a year, etc.). A convenient means to organize, summarize, browse, and search such data would benefit greatly from the decomposition of the collection into threads of relevant articles. The notion of a thread is rather pervasive in the news media; in fact, during the evolution of USENET news as a forum for exchange of ideas. An important step was the development of "threaded news readers." Surprisingly, the search facility at common sources of news articles (e.g., CNN, The New York Times, etc.) do not offer a threaded interface to their archives—"sort by date" and "sort by relevance" appear to be the most commonly available ranking options.

For example, the query "Colin Powell" produces a few thousand responses, and neither of these sorting criteria is quite adequate, especially considering the fact that articles about Mr. Powell can be naturally organized into news threads corresponding to various time periods of his career (e.g., the Gulf war of 1990, his appointment as Secretary of State in 2001, etc.). Furthermore, this organization is not unique, and depends on the "granularity" of the decomposition—a long thread often consists of several shorter threads that are loosely bound together. For example, a collection of articles describing preparations for a war on Iraq emerges as a natural sub-thread of the longer thread during his tenure as Secretary of State, and within this, a European tour by Colin Powell emerges as a finer sub-thread.

Other examples outlined above admit a similarly natural decomposition (e.g., European soccer during 2003 decomposes naturally depending on various leagues, and various international competitions).

Another example in this genre is the case of news articles from a variety of media that match a given keyword (e.g., IBM). These have a natural temporal flavor; they also admit natural partitioning not just in terms of the news source, but also in terms of the emphasis of the content. For example, articles about IBM can be divided into business articles about the performance of the IBM stock, articles containing reviews and descriptions of IBM products, etc.

(2) A second motivating example pertains to medical and legal case histories that practitioners of these fields routinely consult. These documents have natural time stamps associated with them, and are often most conveniently browsed when partitioned into temporally consecutive and semantically coherent threads. While the importance of semantic coherence is fairly obvious, the role of temporal coherence requires a few words of explanation. In fields that are constantly undergoing evolution (as law and medicine certainly are), it is useful to access information sequenced meaningfully along the time axis. For example, in medicine, the identical set of symptoms has led, over time, to rather different conclusions about potential causes and treatments. In such cases, it is not enough to produce (in response to a query that consists of the symptoms) all "relevant" prior cases; it is equally important to order them temporally and find logical "break points" in the sequence at which the various threads of analyses (diagnosis, treatment, etc.) can be divided.

(3) A third motivating example pertains to scientific literature and patent databases. Once again, these documents are naturally time-stamped, and the notion of threads occurs fairly naturally.

The present invention employs a novel algorithmic framework that captures the genre of problems outlined above. The present invention comprises a crisp combinatorial modeling of the problem as a graph decomposition problem for directed acyclic graphs. Loosely speaking, the graph problem is to decompose a given directed acyclic graph into as few node disjoint paths as possible while ensuring that every node participates in at least one path. The problem of identifying and extracting threads from collections of text documents can be rendered as graph decomposition problems whose computational aspects are noteworthy. Specifically, the process of transforming a collection of documents into an input for the graph decomposition process admits a very efficient implementation in the stream-sort model for large data sets [1]. Indeed, in the fields of web search and information retrieval, construction and manipulation of indices are fundamental in computing with large text corpora. With the present invention, the mapping from document collections into graphs adheres in a clean manner to the tenets of the stream-sort model, and hence results in a very efficient implementation. Another advantage of the approach of the present invention of solving a graph decomposition problem is the fact that the "modeling" and "computational" aspects of the thread extraction problem are decoupled; i.e., one may plug and play algorithms for either part of the problem depending on the characteristics of the instances at hand and/or the computational capabilities and limitations of the available resources.

The graph decomposition problem developed herein exhibits an amazing spectrum in terms of its computational complexity, from Np-hard incarnations to ones that admit efficient algorithms—not just polynomial-time efficiency but efficient in the stream-sort model of computation. Fortunately, the class of instances of interest (i.e., directed and acyclic graphs) admits rather efficient algorithms. Specifically, the present invention employs alternative algorithms for this problem: (1) maximum matching in bipartite graphs; and (2) dynamic programming. Each approach has its own advantages, depending on the scale of the problem instances. The matching-based approach of maximum matching is an in-memory approach, and consequently needs sufficient memory to hold the graph. However, the matching-based approach facilitates relatively easy use of (publicly) available and fairly well-optimized code. The dynamic programming approach is tailored to be efficient under the stream-sort model, and therefore admits implementations that require substantially less memory than would be required to hold the graph. Indeed, the present invention highlights the importance of developing stream-sort algorithms for problems on directed and acyclic graphs in the context of search, organization, and mining of document collections.

Section 3 infra illustrates the performance of the algorithms of the present invention by presenting experimental results from a fairly large corpus of news articles (roughly 250,000 news articles that span a time period of over four years). These experiments were conducted on the corpus of all articles, as well as on subcollections that contain specific query terms. These experiments indicate the feasibility of the algorithms at fairly large scale, and also demonstrate the efficacy of the framework described herein in allowing the identification of several natural threads of news stories, some that span several months, and some that have rather large "dormant gaps" in the middle, which makes the task algorithmically quite challenging.

2. Detecting Threads 2.1 Preliminaries

A directed graph $G=(V,E)$ consists of a set V of nodes and a set $E \subset V \times V$ of edges. A graph is weighted if there is a weighting function $w: E \rightarrow R^+$. A directed path p from u to v is a sequence of nodes $u=w_1, \ldots, wk=v$ such that $(w_i, w_{i+1}) \in E$ for every $i=1, \ldots, k-1$; it will be clear from the context whether the nodes or edges in a path are being referred to. A directed cycle is a non-trivial directed path from node u to itself. A directed acyclic graph is a directed graph with no directed cycles.

FIG. 1 is a high-level flow chart for generating and outputting threads of documents, in accordance with embodiments of the present invention. The flow chart of FIG. 1 comprises steps 11-14. A "thread" of documents is time-ordered sequence of documents having common subject matter. In step 11, documents $D=\{D_1, D_1, \ldots\}$ are provided as input. Step 12 generates a relevance graph (see Section 2.2). The relevance graph is a directed acyclic graph. Each node of the relevance graph represents a unique document of the collection D. Step 13 generates threads from the relevance graph by using either a matching-based algorithm (see section 2.4) or by dynamic programming (see Section 2.5). Step 14 outputs the threads generated in step 13. The threads may be outputted by being printed on paper, displayed on a computer screen, stored on a hard disk or optical disc, etc.

2.2 The Relevance Graph

Given a collection C of documents $D=\{D_1, \ldots,\}$ such that the documents collectively comprise a set S of terms of text subject to each document of C comprising at least one term of S, the present invention builds a "relevance" graph that will help identify the threads in the collection C. Let t(D) denote the timestamp of a document of C. The documents are assumed to be linearly-ordered according to their timestamps, with $D_1$ being the earliest document, i.e., $i<j \Rightarrow t(D_i)<t(D_j)$. The relevance graph expresses the relationship/relevance between two documents. Thus, each document of the collection C has a timestamp and an associated timestamp index (e.g., timestamp indexes i and j respectively associated with documents $D_i$ and $D_j$), wherein the timestamp indexes are ordered in accordance with the ordering of the associated timestamps.

A natural way to construct a graph would be take every pair of documents D, D'∈D and add the edge E (D,D') if and only if D and D' are deemed related. The convention adopted herein is that whenever an edge is added between two documents D and D', the edge is always directed from D to D' if t(D)<t(D') and from D' to D if otherwise. Thus, each edge of the graph connects a pair of directed nodes pointing from a node of the pair having an earlier timestamp to a node of the pair having a later timestamp. The documents denoted by the nodes of the pair comprise at least one common term of text. Note that a thread is represented by a path that originates at a first node and terminates at a second node of the graph, wherein the path comprises one or more contiguous edges from the first node to the second node.

Unfortunately, this approach is not scalable. If |D| is even in tens of thousands, it is not possible to construct or represent this graph without compromising efficiency and scalability.

Therefore, the present invention takes an entirely different approach of constructing a relevance graph out of the documents. Let $T=\{T_1, T_2, \ldots\}$ be "terms" in the document collection. A "term" is defined to be a word or phrase. The set of terms is chosen by some appropriate text parsing or entity extraction mechanism and depends on the particular application domain; in this section. The terms may be chosen according to any selection criteria (e.g., all nouns in the document, all terms pertaining to a particular subject such as football, national politics; ...).

Figure 2:
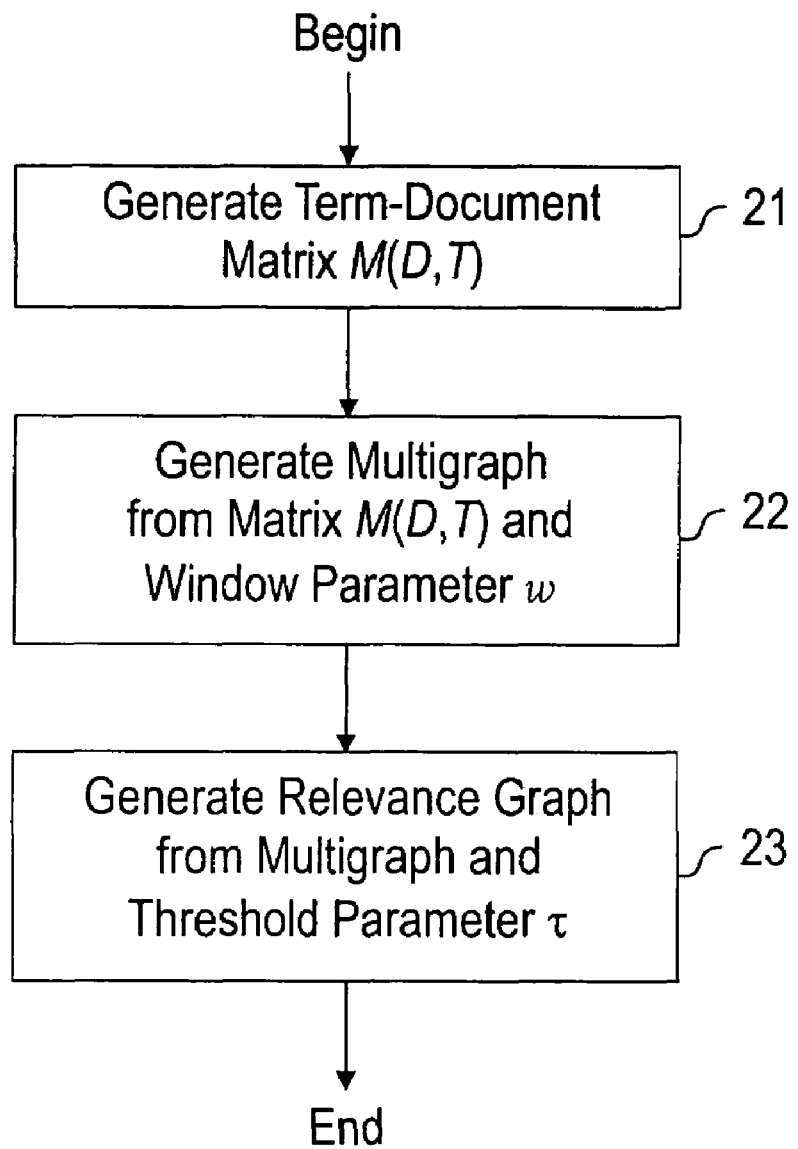
FIG. 2 is a flow chart generating a relevance graph, in accordance with embodiments of the present invention.

FIG. 2 is a flow chart for generating a relevance graph, in accordance with embodiments of the present invention. The flow chart of FIG. 2 comprises steps 21-24.

In step 21, the binary term-document matrix M(D, T) is built, wherein the matrix M corresponds to the terms T and documents D: M(D, T)=1 if and only if term T occurs in document D; otherwise M(D, T)=0. The matrix M is used to build a multigraph in step 22, and the multigraph is rounded in step 23 to generate the relevance graph.

Step 22 generates a multigraph H from the matrix M(D, T) generated in step 21 and a specified (e.g., predetermined) window parameter w. The matrix M is used to determine the number of terms common to the two nodes of each pair of nodes. For each term $T \in T$, $D_T=\{D'_1, D'_2, \ldots\}$, is the set of document postings corresponding to the term, in order of their timestamps. The edge E ($D'_i, D'_j$) is added between documents $D'_i$ and $D'_j$ in the multigraph H if and only if $|i-j| \leq w$; i.e., an edge is added between two documents if the two documents are at most w apart in their ordering in $D_T$ (i.e., the respective timestamp indexes i and j of the nodes of the documents $D'_i$ and $D'_j$ differ by no more than the specified window parameter w. Note that it could happen that $|t(D'_i)-t(D'_j)| >> w$. A multigraph H of the documents results at the end of step 22. For the two nodes in each pair of nodes of the resulting multigraph H, there may be zero edges, 1 edge, or a plurality of edges.

Step 23 generates the relevance graph G from the multigraph H generated in step 22 and a specified (e.g., predetermined) threshold parameter $\tau$. For the two nodes in each pair of nodes of the multigraph H, (a) exactly one edge is added between the same two nodes of the relevance graph G if the number of edges between the two nodes exceeds $\tau$; and (2) there are no edges between the same two nodes of the relevance graph G if the number of edges between the two nodes does not exceed $\tau$. For example with $\tau=12$, given nodes A, B, and C of the multigraph having 15 edges between A and B, 10 edges between B and C, and 20 edges between A and C, the resultant relevance graph has one edge between A and B, no edges between B and C, and one edge between A and C. The resulting relevance graph is a directed acyclic graph.

Table 1 depicts pseudo-code for an exemplary algorithm for generating the relevance graph.

TABLE 1

Algorithm Build-Relevance-Graph (D, T, w, $\tau$)

Let M be the term-document matrix
For $T \in T$ do
  Let $D_T = \{D'_1, D'_2, \ldots\}$
    For $D'_i, D'_j \in D_T$ do
      If $|i - j| < w$ then $E_{D'_i, D'_j} = E_{D'_i, D'_j} + 1$
  For every nonzero entry $E(D_i, D_j)$ do
    If $E_{Di,Dj} \leq \tau$ then $E_{Di,Dj} = 0$
    If $E_{Di,Dj} > \tau$ then $E_{Di,Dj} = 1$
Return nonzero entries of E Thus, the collection C of documents collectively comprising a set S of terms each document of C comprising at least one term of S, each document of C having a timestamp and an associated timestamp index, said timestamp indexes being ordered in accordance with an ordering of the associated timestamps.

There are several advantages to the methodology of the present invention for constructing the relevance graph. A first advantage is avoidance of the quadratic blow up in time and space by restricting attention to a small number of document pairs. At the same time, there is no compromise on documents that are related to each other but do not occur close to each other. The window parameter w facilitates control this behavior. A second advantage is that use of the threshold $\tau$ results in additional control in terms of rounding. By picking a suitably large threshold $\tau$, documents that are brought together by small number of spurious co-occurring terms can be separated. A third advantage is that the algorithm of the present invention is easily modified to deal with a non-binary term-document matrix, perhaps with additional information such as td-idf. A fourth advantage is that the construction can also be modified to work with documents that not totally ordered, but just bucket-ordered.

The above scheme lends itself to an easy implementation in the stream-sort model. Via sorting, the term-document matrix can be accessed in increasing order of terms. For each term, implementing the windowing operation is easy, without using main memory more than O(w), and the entries of E are output as a stream. The thresholding step of E can be implemented in the data stream model [7; 15] augmented with a sort primitive [1].

Since threads are to be identified, it suffices to work with the connected components of the relevance graph, treating the edges as undirected. Aggarwal et al. [1] also offer a simple stream-sort based algorithm to find all the connected components of an undirected graph. This algorithm works by initially assigning a random label l (cdot) to each node of the graph and on seeing an edge (u, v), setting l (u)=l (v)=min(l (u), l (v)). This algorithm was shown to make O(log n) passes over the edges, where each pass takes O(n) time. The present invention uses this algorithm to output the connected components of the relevance graph. Threads for each of the components can be found separately. The remainder of Section 2 works with a single such connected component.

2.3 The (a,b)-Threads Problem

Threads represent directed paths in the relevance graph. Given such a graph, the problem of finding the best threads can be naturally cast in a combinatorial optimization framework. While there are several ways to carry out this, the present invention adopts the following formulation. Given a directed graph, find small number of disjoint directed paths to cover as many nodes as possible in the graph. Formally, the decision version of the (a, b)-threads problem is stated next as Problem 1.

Problem 1 ((a, b)-THREADS PROBLEM). Given a directed acyclic graph G=(V,E) and parameters a, b>0, are there at most a node-disjoint directed paths (each of length at least one) such that the number of nodes included in the union of the paths is at least b?

In this most general bicriteria formulation, the (a, b)-threads problem is as hard as the Hamiltonian path problem [12]. If a=1, then maximizing b is the longest path problem. It is a fact that (1, n)-threads problem is NP-hard.

2.4 A Matching-Based Algorithm

A simple lower bound inspires the matching-based algorithm. Thus, $b \geq M(G)$, where M(G) is the size of the maximum matching in G, when treated as an undirected graph. The graph G is the relevance graph described supra. Using this observation, the first realization is that if the bicriterion formulation of the (a, b)-threads problem is appropriately relaxed, then the problem can be solved optimally. The relaxation is to ignore a and just try to maximize b. Then, the problem can be solved optimally via the maximum matching algorithm. The only non-trivial aspect is that the matching has to be performed on a slightly different graph, whose construction is given below.

In the maximum matching problem, there is given an undirected bipartite graph G=(U, V,E) with |U|=n=|V| and E ⊆U×V. The goal is to find a subset of edges E' ⊂ E of maximum cardinality such that each node in U, V is incident on at most one of the edges in E'. The subset of edges E' is a maximal set of edges not having a common endpoint (i.e., do not touch each other). Maximum matching in bipartite graphs can be solved in $O(n^{5/2})$ time via the algorithm of Hopcroft and Karp [16].

Given a directed acyclic graph G=(V,E), an undirected bipartite G'=(V', V", E') is constructed. The vertex set V'={a'|a∈V} V"={a"|a∈V}, i.e., consists of a', a" for every a∈V. The edge set is given by E'={(u', v')|(u, v)∈E}.

Selecting an edge (u', v')∈E' represents selecting the directed edge (u, v)∈E and the matching constraint ensures that each node in G is matched at most once. After finding the maximum matching, the edges in the matching are referred back to the edges in G to construct the directed paths in G. The standard union-find data structure is used to recover the threads from the matched edges. Table 2 depicts pseudo-code for an exemplary algorithm for generating threads by maximum matching.

TABLE 2

Algorithm Matching-Based-Threads (G).

Construct G' = (V', V",E') from G = (V,E)
M' = MaxMatching (G')
For each (u', v") ∈ M' do
    Union (Find (u'), Find (v"))

A collection of threads in G of size b naturally implies a matching of size b in G'. Conversely, any matching of size b in G' can be decoded into a collection of node-disjoint paths in G; the matching criterion translates to the node-disjointness requirement. Thus, the above algorithm solves the (*, b)-threads problem in polynomial time. The matching-based formulation has the elegant appeal of solving a relaxed version of the (a, b)-threads problem exactly.

Figure 3:
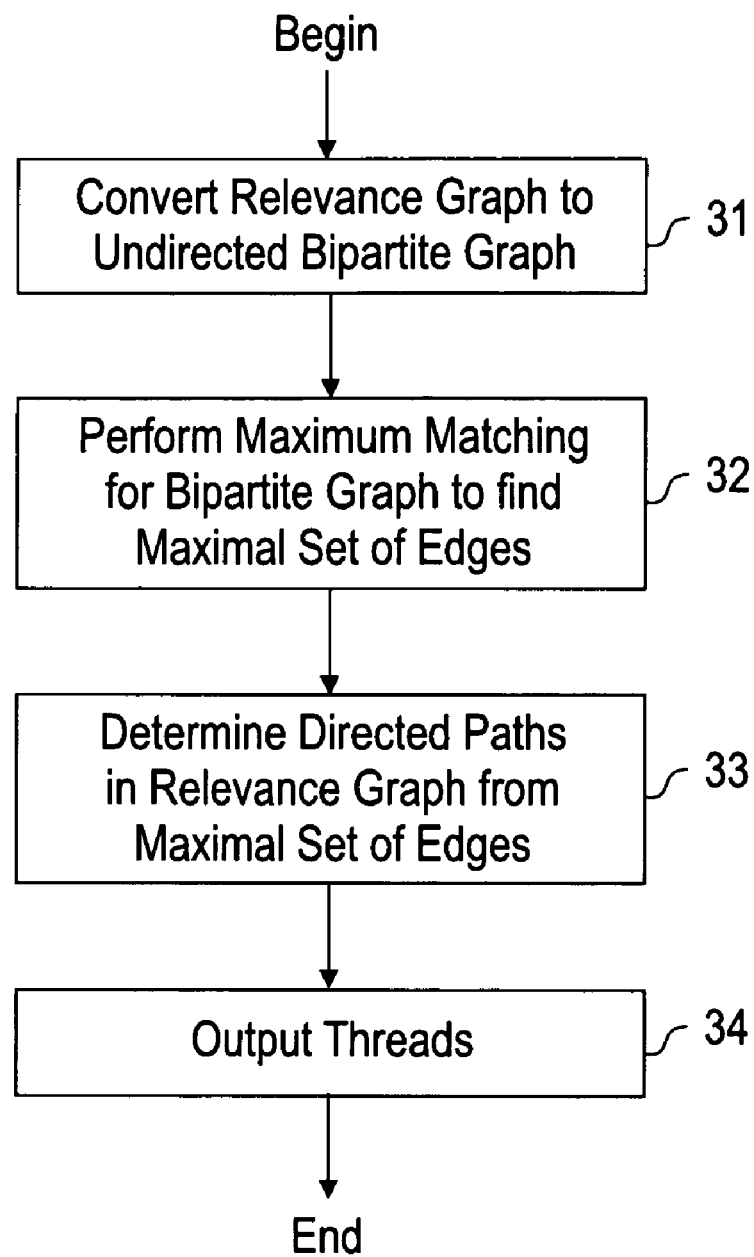
FIG. 3 is a flow chart for determining threads by maximum matching, in accordance with embodiments of the present invention.

FIG. 3 is a flow chart for determining threads by maximum matching, in accordance with embodiments of the present invention. The flow chart of FIG. 3 comprises steps 31-34.

Step 31 converts a relevance graph G=(V,E), which is a directed acyclic graph, to an associated undirected bipartite graph G'=(V', V", E').

Step 32 performs maximum matching for the bipartite graph G' resulting from step 31 to find a maximal set of edges E' not having a common endpoint (i.e., not touching each other). There may be multiple solutions (i.e., multiple maximal sets of edges), and a maximum matching algorithm may output a maximal set of edges of the multiple maximal sets of edges.

Step 33 determines directed paths in the relevance graph G from a maximal set of edges E' outputted in step 32, by the edges E' in G' being referred back to the edges E in G. The directed paths resulting from step 33 define the output threads resulting from the matching-based algorithm.

Step 34 outputs the threads determined in step 33. The threads may be outputted in any manner or form known to a person of ordinary skill in the art such as by, inter alia: printing the threads on hard copy, displaying the threads on a computer screen, writing the threads to storage (e.g., to a hard disc, optical disc, etc.).

Figure 4A:
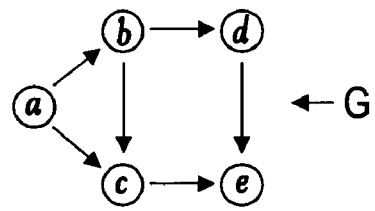
FIGS. 4A and 4B depict an exemplary relevance graph and its associated bipartite graph, respectively, in accordance with embodiments of the present invention.
Figure 4B:
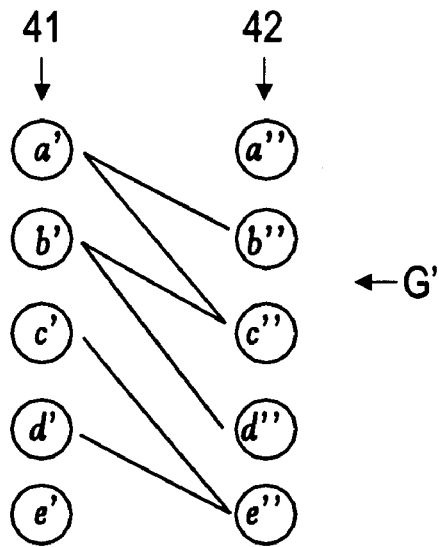

FIGS. 4A and 4B depict an exemplary relevance graph G (FIG. 4A) and its associated bipartite graph G' (FIG. 4B), in accordance with embodiments of the present invention. The relevance graph G in FIG. 4A is a directed acyclic graph comprising nodes a, b, c, d, e. The bipartite graph G' in FIG. 4B comprises two parallel column 41 and 42, wherein column 41 represents the nodes a, b, c, d, e of FIG. 4A as a', b', c', d', e', and wherein column 42 represents the nodes a, b, c, d, e of FIG. 4A as a", b", c", d", e". Thus each node in FIG. 4A appears as two nodes in FIG. 4B (e.g., node a in FIG. 4A appears as nodes a' and a" in FIG. 4B). Note that each directed edge in FIG. 4A appears as an undirected edge in FIG. 4B (e.g., the directed edge a→b in FIG. 4A appears as an undirected edge a'-b" in FIG. 4B). Step 31 of FIG. 3 performs the conversion of the relevance graph G in FIG. 4A to the bipartite graph G' in FIG. 4B.

The maximum matching performed on the bipartite graph G' in FIG. 4B (step 32 of FIG. 3) results in a maximal set of 3 edges E' not having a common endpoint. As stated supra, the maximum matching has multiple solutions E'. Thus, the maximal set of 3 edges E' is not unique. A first solution for E' is {a'-b", b'-d", d'-e"}; a second solution for E' is {a'-c", b'-d", c'-e"}; etc.

The directed paths (i.e., threads) in FIG. 4A are derived from the maximal set of 3 edges E'. For the first solution supra wherein the maximal set of 3 edges {a'-b", b'-d", d'-e"}, there is one associated directed path in FIG. 4A, namely a→b→d→e. For the second solution supra wherein the maximal set of 3 edges is {a'-c", b'-d", c'-e"}, there are two associated directed paths in FIG. 4A, namely a→c→e and b→d. The scope of the present invention includes outputting one maximal set of edges E in step 32 of FIG. 3 and determining the associated directed paths (i.e., threads) in step 33 of FIG. 3.

Figure 5:
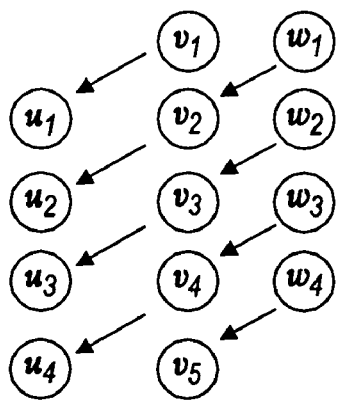
FIG. 5 depicts a case in which a matching-based algorithm identifies five separate threads, in accordance with embodiments of the present invention.

Since the matching-based algorithm maximizes b, the algorithm might produce threads that are fragmented. For example, FIG. 5 depicts a case in which a matching-based algorithm identifies five separate threads ($v_1 \to u_1$, $w_1 \to v_2 \to u_2$, $w_2 \to v_3 \to u_3$, $w_3 \to v_4 \to u_4$, $w_4 \to w_5$), in accordance with embodiments of the present invention. A less fragmented output one longer thread might be $v_1 \to v_2 \to v_3 \to v_4 \to v_5$.

2.5 Dynamic Programming

In this section, two dynamic programming algorithms are presented for extracting threads from a collection of documents represented in a relevance graph. The first dynamic programming algorithm is a longest path algorithm. The second dynamic programming algorithm is a maximal chain cover dynamic programming algorithm.

2.5.1 The Longest Path Dynamic Programming Algorithm

The longest path dynamic programming algorithm section repeatedly removes long paths identified using dynamic programming, by utilizing the fact that the longest paths in the acyclic graphs can be easily found. Given the directed acyclic graph G=(V,E) of documents, for j∈V, let l(j) denote the longest path ending in node j of G. The graph G is the relevance graph described supra. Given l(i) for all i<j, where < is an arbitrarily fixed topological order of G, l(j) may be recursively computed as $\max_{i:(i,j)\in E}(1+l(i))$. This can be accomplished by a dynamic programming implementation with O(n) nodes, where n=|V|. Furthermore, the dynamic programming algorithm for this problem admits a simple streamsort implementation if for j∈V and all in-neighbors i of j, all the in-edges of i appear before all the in-edges of j; i.e., the edges are ordered topologically by their destination node.

Furthermore, after removing the nodes from G that are included in a longest path, the algorithm may be iteratively repeated with the remaining edges to obtain further paths until G is empty (i.e., devoid of nodes). Using an efficient hash table to keep track of covered nodes, a very efficient implementation of this algorithm is accomplished Table 3 depicts pseudo-code for an exemplary longest path dynamic programming algorithm for generating threads.

TABLE 3

| Algorithm DP1-Based-Threads (G = (V,E)) |
| --- |
| Repeat<br>    p = longest path in G<br>    Output p<br>    G = G – p<br>Until G is empty |

Figure 6:
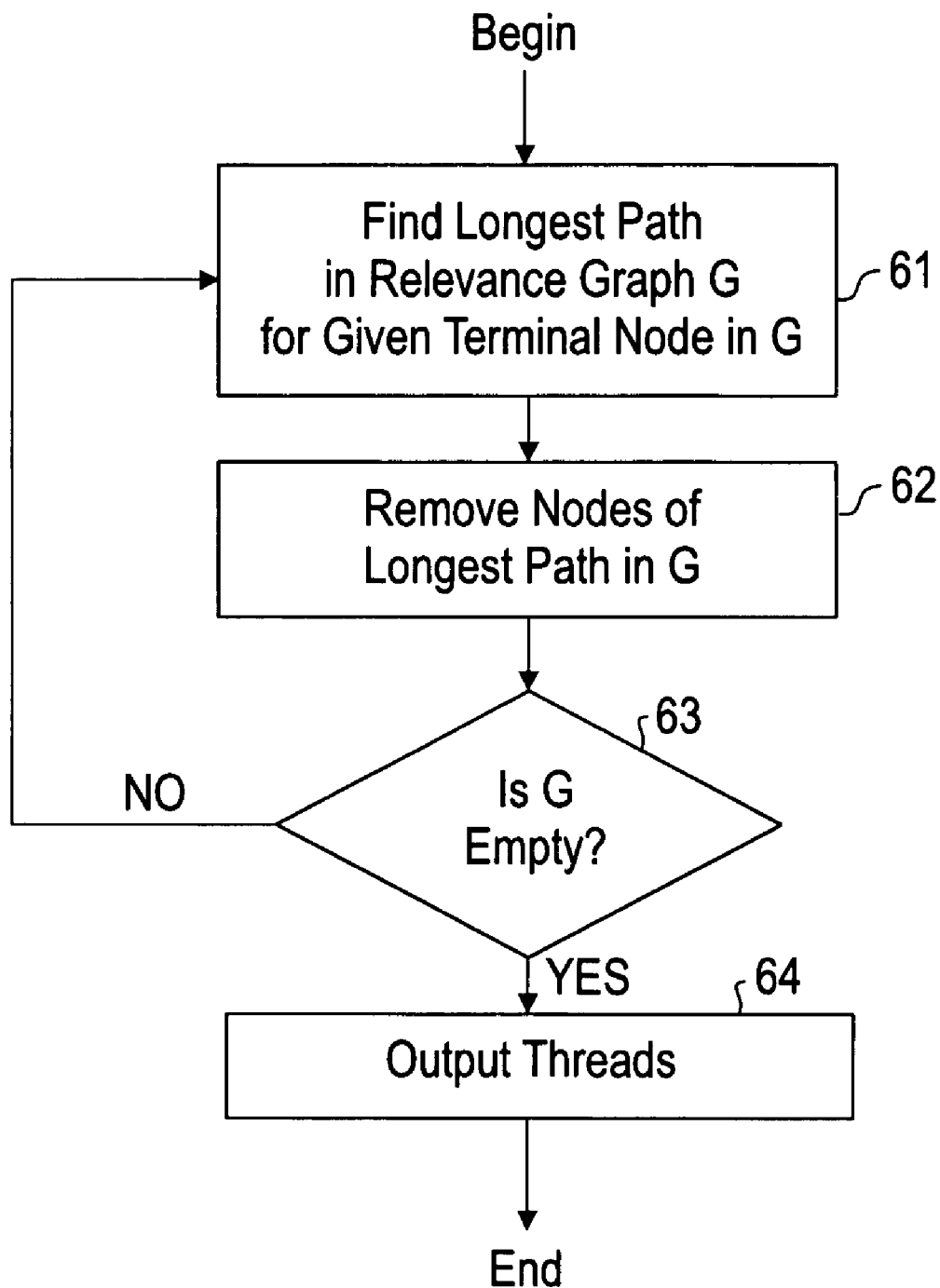
FIG. 6 is a flow chart for determining threads by a longest path dynamic programming algorithm, in accordance with embodiments of the present invention.

FIG. 6 is a flow chart for determining threads by a longest path dynamic programming algorithm, in accordance with embodiments of the present invention. The flow chart of FIG. 6 comprises steps 61-64. Step 61 finds the longest path l(j) in G for given terminal node j. The longest path l(j) is a thread. Step 62 removes from G the nodes of the longest path l(j) found in step 61. If G is empty, step 63 ends the algorithm; otherwise step 63 causes the algorithm to iteratively loop back to step 61 to find another longest path in G for a given terminal node until G is empty (i.e., devoid of nodes).

Step 64 outputs the threads determined in step 61. The threads may be outputted in any manner or form known to a person of ordinary skill in the art such as by, inter alia: printing the threads on hard copy, displaying the threads on a computer screen, writing the threads to storage (e.g., to a hard disc, optical disc, etc.).

2.5.2 The Maximal Chain Cover Dynamic Programming Algorithm

The maximal chain cover dynamic programming algorithm solves the (a, b)-threads problem in polynomial time, where b is fixed to be n and the goal is to minimize a. This dynamic programming algorithm computes the maximal chain cover of the directed acyclic graph and can be implementable in the streamsort model.

Given the directed acyclic graph G=(V,E) of documents, and an integer parameter T denoting the maximum number of allowed threads, a goal is to find out if the nodes of V can be covered with at most T node-disjoint directed paths. The graph G is the relevance graph described supra. Let $\tau$ denote an arbitrarily fixed topological order on the nodes of G; wlog.

It is assumed that the set $\{\tau(i)|i \in V\}$ is the set $\{1, \ldots, n\}$, where n=|V|, so that the nodes may be identified with their rank in $\tau$.

Figure 7:
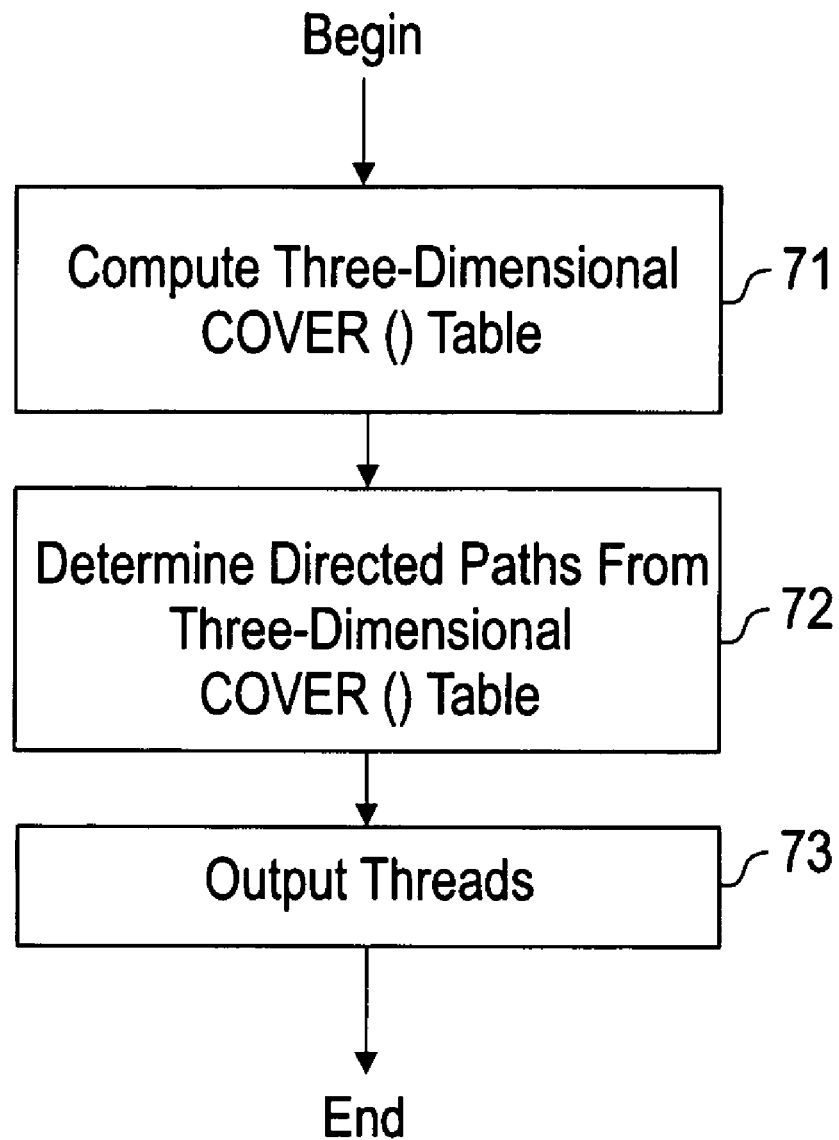
FIG. 7 is a flow chart for determining threads by a maximal chain cover dynamic programming algorithm using a three-dimensional COVER( ) table, in accordance with embodiments of the present invention.

FIG. 7 is a flow chart for determining threads by a maximal chain cover dynamic programming algorithm using a three-dimensional COVER( ) table, in accordance with embodiments of the present invention. The flow chart of FIG. 7 comprises steps 71-73. The table COVER(k, t, i) is defined such that COVER(k, t, i)=1 if all nodes $\leq$k can be covered with at most t node-disjoint paths such that node i is a leaf node in one of these node-disjoint paths, wherein COVER(k, t, i)=0 otherwise.

Step 71 computes the three-dimensional COVER( ) table as follows. For j∈V, it is assumed that COVER(j−1, t, i) is available for all i such that (i,j)∈E. The algorithm determines the entries COVER(j, t, i) for all i$\leq$j. Namely, COVER(j, t, j)=1 if and only if for cover(j−1, t, i)=1 for some i such that (i,j)∈E. Furthermore, COVER(j, t, i)=1 for i<j if and only if COVER(j−1, t, i) and there is some node i' such that i'$\neq$i and COVER(−1, t, i')=1 and (i', j)∈E. Finally, COVER(j, t+1, j)=1 if COVER(j−1, t, i) is true for some i<j, and similarly COVER(j, t+1, i)=1 if COVER(j−1, t, i)=1.

Step 72 determines the directed paths (i.e., the threads) from the three-dimensional COVER( ) table computed in step 71.

Step 73 outputs the threads determined in step 72. The threads may be outputted in any manner or form known to a person of ordinary skill in the art such as by, inter alia: printing the threads on hard copy, displaying the threads on a computer screen, writing the threads to storage (e.g., to a hard disc, optical disc, etc.).

Figure 8:
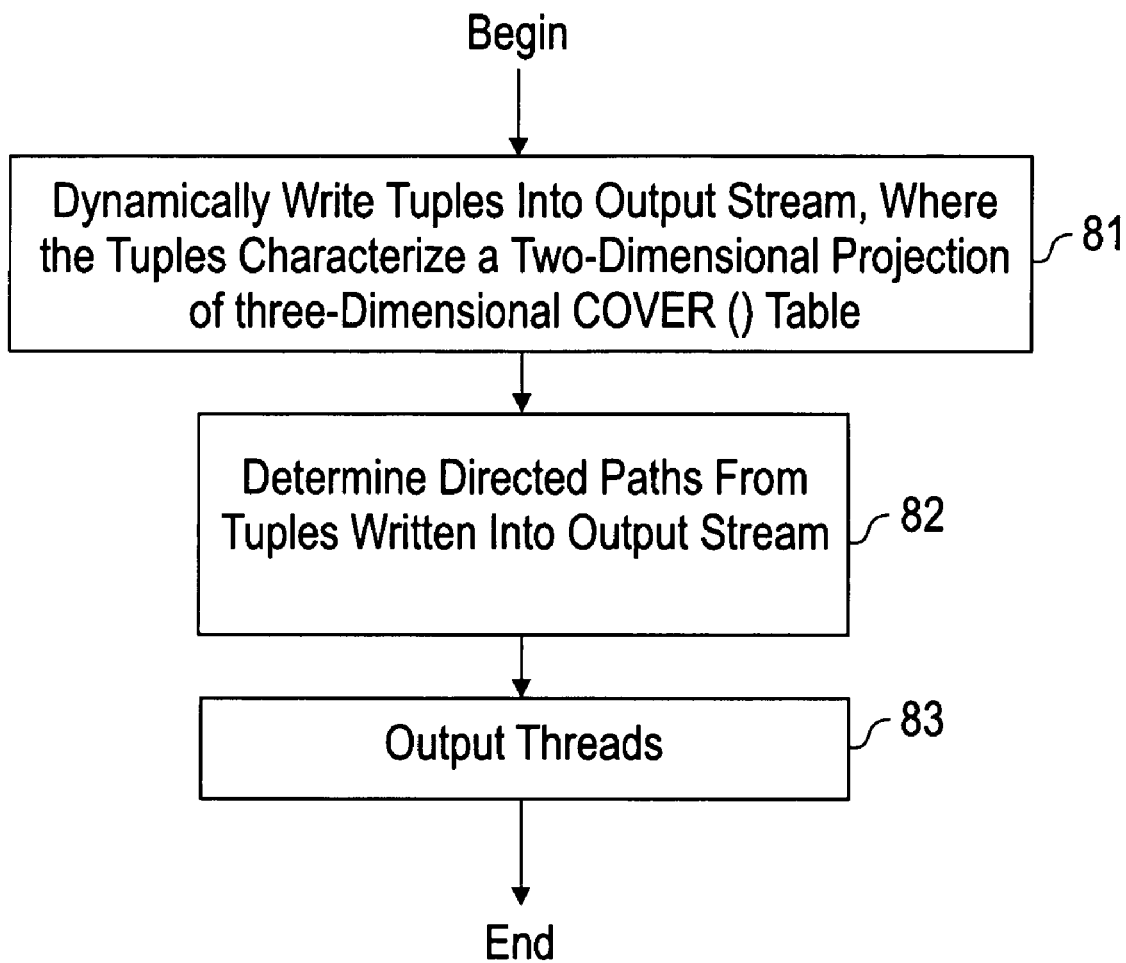
FIG. 8 is a flow chart for determining threads by a maximal chain cover dynamic programming algorithm using a stream-sort model, in accordance with embodiments of the present invention.

The recurrences in the algorithm of FIG. 7 lead to an algorithm in the stream-sort model. Accordingly, FIG. 8 is a flow chart for determining threads by a maximal chain cover dynamic programming algorithm using a stream-sort model, in accordance with embodiments of the present invention. The flow chart of FIG. 8 comprises steps 81-83. A T×n table is maintained such that the table corresponds to the second and third co-ordinates of the table COVER. Note that if the edges are presented in topological order of the destination node, then there is no need for a 3-dimensional array as suggested by the recurrence. An implementation detail is that it is not necessary to compute COVER(j, t, i) for every value of i (which would take $n^2$ steps from the definition); since all edges pointing into j at the same time are obtained, it is necessary to consider only $N(j)^2$ pairs (i, i') that are relevant. To trace the actual paths, rather than resort to a 3-dimensional array of size n×T×n, it is possible to compute COVER(j, t, •) and COVER(j, t+1, •) and write an output stream that contains information necessary to trace the paths. For example, if it is determined that COVER(j, t, j)=1 because for some i, COVER(j, t, i)=1 and (i,j)∈E (which could be determined at the time the edges with destination j are processed), the tuple (j, t, j, i) is written into the output stream. Thus, step 81 dynamically writes the tuples (j, t, j, i) into the output stream. Note that these tuples characterize a two-dimensional projection COVER(j, t, •) of the three-dimensional COVER(k, t, i) table. In step 82, these tuples are post-processed (using the sorting primitive) to construct the actual directed paths (i.e., the actual threads).

Step 83 outputs the threads determined in step 82. The threads may be outputted in any manner or form known to a person of ordinary skill in the art such as by, inter alia: printing the threads on hard copy, displaying the threads on a computer screen, writing the threads to storage (e.g., to a hard disc, optical disc, etc.).

3. Experiments and Results

This section describes experiments by the inventors of the present invention on news articles and the results obtained.

3.1 Experiments

The data source used herein is The Hindu, a daily newspaper from India. This popular newspaper is published in the English language, and is very broad in its coverage of news items ranging from local to international articles of importance. All the articles in the online version of the newspaper (www.hinduonnet.com) was obtained from Jan. 1, 2004 to Mar. 31, 2004.

The algorithms of the present invention were tested on the aforementioned collection of news articles. All the articles were obtained and parsed to collect various entities and terms in the documents. Extremely simple heuristics were used to extract the entities and terms in the documents. More sophisticated algorithms will lead to even better quality results. Each news article comes with an obvious time stamp and ties are randomly broken to obtain a linear ordering of the articles. A Boolean term-document matrix is then constructed from the articles and the terms.

An index consists of roughly 0.25M articles and 0.64 terms. The number of nonzero entries in the term-document matrix was 21M. Thus, on average, a term occurs in roughly 31 documents and a document contains around 86 terms.

The term-document matrix M was outputted as a stream of term id, document id pairs and using the powerful sort primitive several times, the relevance graph G was constructed from M. Experimented with were two different values of the window parameter w=5, 10 and the threshold parameter τ=1, 5, 10, . . . , 50. The size of the relevance graph grows with larger w but shrinks with larger τ. This provides a simple tradeoff between efficiency and effectiveness. While the number of edges with w=5, τ=10 is ≈0.3M, and the number of edges with w=10, τ=10 grows to ≈0.1B edges.

The connected components algorithm is applied to decompose the relevance graph. For each of the components, the thread-detection algorithms of the present invention were applied.

3.2 Results

The results are presented in the forming of interesting threads uncovered by the algorithms. In terms of quality of results/performance, there was no significant difference in terms of quality between the matching-based and the dynamic programming algorithms. However, the dynamic programming algorithm is expected to be both efficient and effective for larger collection of articles owing to its stream-sort implementation.

Table 4 shows the summary statistics obtained by the algorithm on graphs with various values of w and τ. As τ is increased, the graph becomes sparse and each connected component will consists of articles with lot of term overlap. Hence, the average thread length increases. On the other hand, if w is increased, more articles participate in the graph. However, it appears that w plays less of a role than τ in its effect on the quality of the results.

TABLE 4

Summary Statistics of the Experiment For the Entire Collection.

| w | τ | Nodes | Edges of CC | # CCs | Avg size of threads | # Threads of threads | Avg len. | Max. len |
|---|---|---|---|---|---|---|---|---|
| 5 | 5 | 41423 | 88870 | 2974 | 9 | 5506 | 4 | 1034 |
| 5 | 25 | 2711 | 8308 | 260 | 8 | 312 | 6 | 588 |
| 5 | 50 | 922 | 4200 | 50 | 16 | 59 | 14 | 426 |
| 10 | 5 | 49647 | 161994 | 3083 | 11 | 7142 | 4 | 1034 |
| 10 | 25 | 2872 | 14281 | 260 | 8 | 341 | 6 | 588 |
| 10 | 50 | 949 | 6851 | 46 | 18 | 61 | 13 | 312 |

Table 5 shows the parameters when the graph is restricted to include articles mentioning a query word. Notice that the average size of connected components and the number and length of threads corresponding to the query 'terrorist' is higher than the rest of the queries. This is because the articles referring to other topics are more local and the longevity is limited (e.g., President Clinton's visit to India or a soccer tournament.).

TABLE 5

Summary Statistics For Some Subcollection of Articles

| Query | Nodes | Edges of CC | # CCs | Avg size of CC | # Threads | Avg len. of threads | Max. len of threads |
|---|---|---|---|---|---|---|---|
| Clinton | 2085 | 37752 | 49 | 6 | 84 | 4 | 15 |
| football | 1277 | 2959 | 57 | 19 | 212 | 5 | 34 |
| maran | 412 | 542 | 35 | 8 | 70 | 4 | 26 |
| terrorist | 4805 | 20937 | 9 | 488 | 620 | 7 | 46 |

Six anectodal examples are presented in Tables 6-11, illustrating the performance of the algorithms of the present invention.

Table 6 was obtained from the entire graph (with $w=\tau=10$) and shows a thread corresponding to the 65th Corus Chess tournament held in 2003, from the beginning to the end.

TABLE 6

Thread Corresponding to Corus Chess Tournament, 2003.

| Date | Title |
|---|---|
| Jan. 11, 2003 | Stage set for Corus tourney |
| Jan. 13, 2003 | Karpov, Bareev in lead |
| Jan. 14, 2003 | Anand scores over Topalov |
| Jan. 17, 2003 | Polgar stuns Karpov, goes into lead |
| Jan. 18, 2003 | Anand beats Karpov |
| Jan. 19, 2003 | Keen contests in the offing |
| Jan. 20, 2003 | Anand makes quick draw |
| Jan. 21, 2003 | Anand crushes Ponomariov |
| Jan. 22, 2003 | Anand surges into sole lead |
| Jan. 23, 2003 | Anand keeps lead after quick draw |
| Jan. 24, 2003 | Anand has to tread cautiously |
| Jan. 26, 2003 | Anand plays out a quick draw |
| Jan. 27, 2003 | Viswanathan Anand wins |

Examples of threads are indicated when the algorithm was run on subcollections of articles corresponding to different queries. Table 7 shows a thread that was obtained when the algorithm was run on the graph corresponding to the query 'Clinton'. It follows the thread of IRA attacks and the time span of the articles identified as part of the thread spans several months. Table 8, obtained from the same graph, shows the Elian Gonzalez drama that took place in April. May 2000. The time span is much shorter in this case. Table 9 was obtained from the graph corresponding to the query term 'terrorist' and the time span of this thread spans over two years.

TABLE 7

Thread Indicating IRA Attacks.

| Date | Title |
|---|---|
| Mar. 05, 2001 | Blast damages BBC office |
| Mar. 06, 2001 | Britain placed on high alert |
| May 01, 2001 | McGuinness may admit role in IRA |
| Jun. 02, 2001 | IRA arms dumps still intact, say inspectors |
| Aug. 01, 2001 | N. Ireland: Loyalists threaten more violence |
| Aug. 05, 2001 | Blast puts Ulster deal in doubt |
| Aug. 08, 2001 | A breakthrough in Ulster |
| Aug. 18, 2001 | Colombian links hit peace process |
| Aug. 25, 2001 | Remove Sinn Fein from Executive, say hardliners |

TABLE 8

Thread Corresponding to Elian Gonzalez Drama.

| Date | Title |
|---|---|
| Apr. 15, 2000 | Temporary stay against Elian's transfer |
| Apr. 16, 2000 | Court asked to order Elian handover |
| Apr. 21, 2000 | Court orders Elian's stay in U.S. for now |
| Apr. 23, 2000 | U.S. enforces Elian-father reunion |
| Apr. 25, 2000 | Elian episode raises passions on Capitol Hill |
| Apr. 27, 2000 | Senate panel may open hearings on Elian |
| May 01, 2000 | Elian case leaves impact on Florida politics |

TABLE 9

Thread Corresponding to Basque.

| Date | Title |
|---|---|
| Aug. 09, 2000 | Five killed in two Basque blasts |
| Aug. 11, 2000 | Army officer falls victim to ETA's |
| Aug. 27, 2000 | Pain in Spain |
| Sep. 17, 2000 | ETA chief, wife arrested |
| Nov. 25, 2000 | Massive protest against ETA actions |
| Dec. 22, 2000 | Recurring ETA attacks baffle police |
| May 20, 2001 | Moderation is the message |

TABLE 9-continued

Thread Corresponding to Basque.

| Date | Title |
| --- | --- |
| Aug. 28, 2002 | Violence won't end, says ETA's political wing |
| Sep. 03, 2002 | Ban on Batasuna angers Basques |

Table 10, obtained from the subcollection corresponding to the query 'maran', shows the thread corresponding to hospitalization and subsequent recovery of a local politician. Table 11, obtained from the subcollection corresponding to the query 'football', shows the thread corresponding to the 2000 Champions League soccer.

TABLE 10

Thread Corresponding to Mr. Maran, an Indian Politician Who Was Hospitalized But Later Recovered in 2002.

| Date | Title |
| --- | --- |
| Jul. 17, 2002 | Maran hospitalized |
| Jul. 23, 2002 | Maran undergoes surgery |
| Jul. 30, 2002 | Maran discharged |
| Sep. 26, 2002 | Maran operated upon |
| Sep. 27, 2002 | 'Maran stable' |
| Sep. 28, 2002 | Murasoli Maran taken off ventilator |
| Oct. 01, 2002 | No improvement in Maran's condition |
| Oct. 02, 2002 | U.S. doctor consulted on Maran's condition |
| Oct. 03, 2002 | Maran's condition stable |
| Oct. 04, 2002 | Marginal improvement in Maran's condition |
| Oct. 06, 2002 | Maran's condition improves |
| Oct. 11, 2002 | Further improvement in Maran's health |

TABLE 11

Thread Corresponding to 2000 Champions League Soccer.

| Date | Title |
| --- | --- |
| Apr. 18, 2000 | Chelsea and Valencia have a job on hand |
| May 04, 2000 | Valencia batters Barcelona |
| May 11, 2000 | Bad boy Anelka turns hero for Real |
| May 12, 2000 | Valencia through to final despite defeat |
| May 24, 2000 | It's the stars of Real vs the youth brigade of Valencia |
| May 26, 2000 | Real Madrid lives up to its reputation |

The experiments showed that the algorithms of the present invention are extremely effective in locating threads in these news articles.

The problem of thread identification goes beyond the realm of news articles and can be applied to various temporal collections including patents, medical databases, legal documents, archives, scientific citations, etc. It is expected that the results can be improved even more if one were to apply sophisticated term extraction methods that are suited to particular application domain.

A more general formulation of the problem would allow small width trees (instead of just directed paths) so as to identify subthreads in a thread, or require that there are many edges between the initial and later portion of the thread so as to prevent topic drift. These problems fall under the purview of partition problems in directed graphs (e.g., see [20]).

4. Computer System

Figure 9:
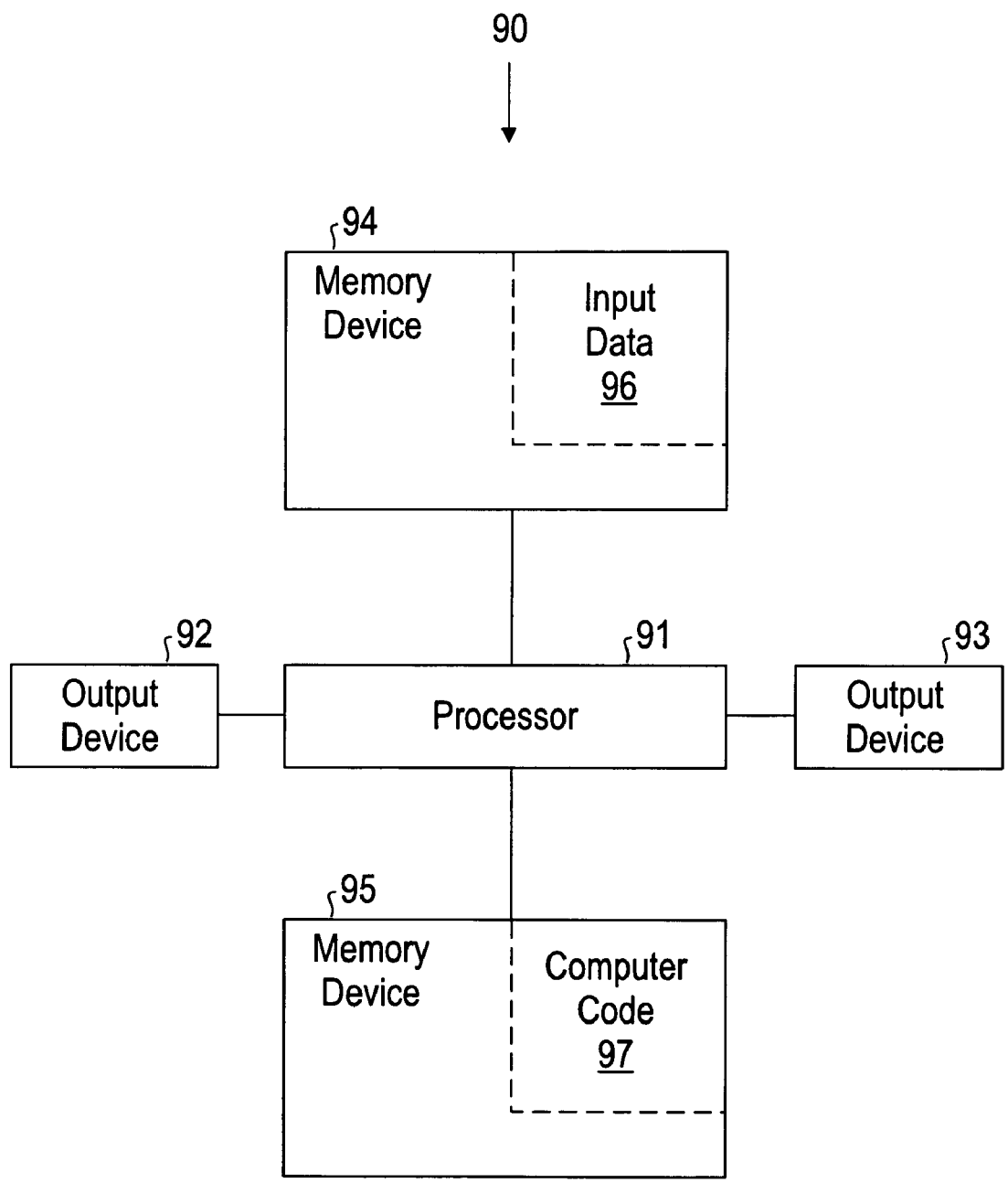
FIG. 9 illustrates a computer system 90 used for generating threads, in accordance with embodiments of the present invention.

FIG. 9 illustrates a computer system 90 used for generating threads, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for generating threads. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for generating threads.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

What is claimed is:

1. A method for generating threads of documents from a collection C of documents, said collection C collectively comprising a set S of terms, each document of C comprising at least one term of S, each document of C having a timestamp and an associated timestamp index, said timestamp indexes being ordered in accordance with an ordering of the associated timestamps, a computer-readable memory unit containing instruction that are executed on a processor of a computer system to perform said method, said method comprising:

generating a relevance graph G from C, G being an acyclic directed graph consisting of nodes and edges, each node of G denoting a unique document of C, each edge of G connecting a pair of directed nodes pointing from a node of the pair having an earlier timestamp to a node of the pair having a later timestamp, the documents denoted by the nodes of the pair comprising at least one common term of text;

determining at least one thread of G by executing an algorithm selected from the group consisting of a matching-based algorithm and a dynamic programming algorithm, each thread of the at least one thread being a path through G that originates at a first node of G and terminates at a second node of G, said path comprising one or more contiguous edges of G from the first node to the second node; and outputting the at least one thread, said outputting selected from the group consisting of printing the at least one thread on hard copy, displaying the at least one thread on a computer screen, writing the at least one thread to storage, and combinations thereof, wherein generating the relevance graph G from C comprises:

generating a multigraph H comprising nodes such that each node of H denotes a unique document of C, wherein said generating H comprises: inserting an edge between two nodes in each pair of nodes of H for each term of S that is common to the two nodes as a consequence of the respective timestamp indexes of the two nodes differing by no more than a specified window parameter w; and generating the relevance matrix G from the multigraph H, wherein said generating G from H comprises setting G=H subject to: deleting edges between the two nodes in each pair of nodes of H as a consequence of a number of edges between the two nodes in each pair of nodes of H not exceeding a specified threshold $\Theta$; and replacing the edges between the two nodes in each pair of nodes of H by one edge as a consequence of the number of edges between the two nodes in each pair of nodes of H exceeding $\Theta$.

2. The method of claim 1, wherein said generating H comprises:

generating a two-dimensional matrix M whose first dimension indexes the documents of C and whose second dimension indexes the terms S, wherein $M(D,T)=1$ if and only if term T occurs in document D and $M(D,T)=0$ otherwise; and determining from the matrix M the number of terms of S common to the two nodes in each pair of nodes of M.

3. The method of claim 1, wherein the algorithm is the dynamic programming algorithm, wherein the dynamic programming algorithm is a maximal chain cover dynamic programming algorithm, wherein executing the maximal chain cover dynamic programming algorithm comprises computing a three-dimensional table COVER(k, t, i), and wherein COVER(k, t, i)=1 if all nodes $\leq k$ in G can be covered with at most t node-disjoint paths in G such that node i in G is a leaf node in one of said node-disjoint paths and COVER(k, t, i)=0 otherwise.

4. The method of claim 1, wherein the algorithm is the dynamic programming algorithm, wherein the dynamic programming algorithm is a maximal chain cover dynamic programming algorithm, wherein executing the maximal chain cover dynamic programming algorithm comprises dynamically computing a two-dimensional projection COVER(j, t, •) of a three-dimensional table COVER(k, t, i) in conjunction with a stream-sort model, and wherein COVER(k, t, i)=1 if all nodes $\leq k$ in G can be covered with at most t node-disjoint paths in G such that node i in G is a leaf node in one of said node-disjoint paths and COVER(k, t, i)=0 otherwise.

* * * * *